No. 715,067. Patented Dec. 2, 1902.
J. HEYDE.
SPEED MEASURE FOR ROTARY SHAFTS.
(Application filed Aug. 15, 1901.)

(No Model.) 4 Sheets—Sheet 1.

Witnesses
Inventor
Attorneys

No. 715,067. Patented Dec. 2, 1902.
J. HEYDE.
SPEED MEASURE FOR ROTARY SHAFTS.
(Application filed Aug. 15, 1901.)
(No Model.) 4 Sheets—Sheet 2.

No. 715,067. Patented Dec. 2, 1902.
J. HEYDE.
SPEED MEASURE FOR ROTARY SHAFTS.
(Application filed Aug. 15, 1901.)
(No Model.) 4 Sheets—Sheet 3.

Witnesses
Inventor

No. 715,067. Patented Dec. 2, 1902.
J. HEYDE.
SPEED MEASURE FOR ROTARY SHAFTS.
(Application filed Aug. 15, 1901.)
(No Model.) 4 Sheets—Sheet 4.
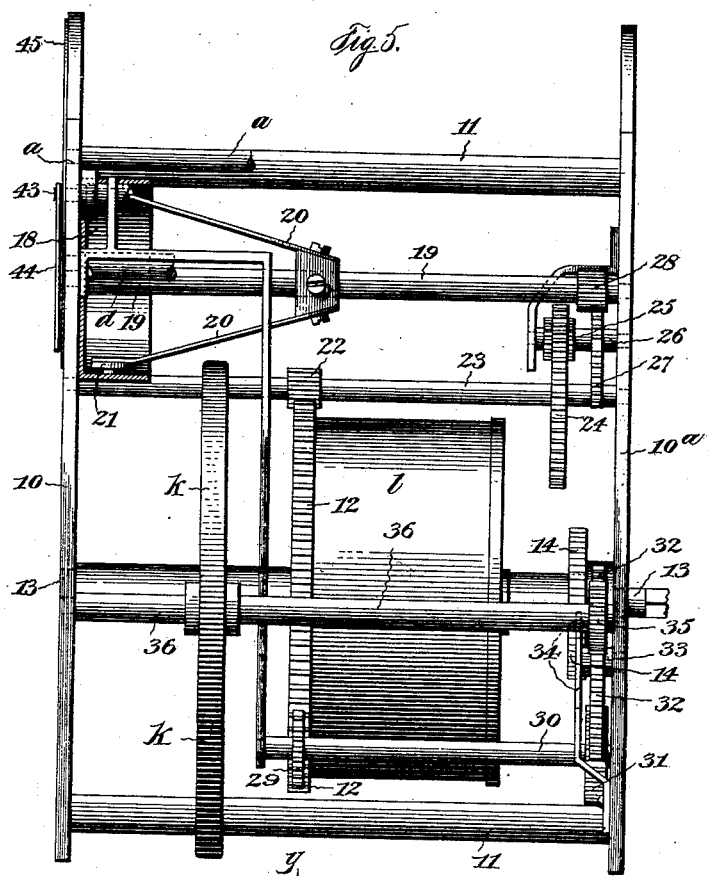
Witnesses: Inventor
Julius Heyde
By
Attys.

UNITED STATES PATENT OFFICE.

JULIUS HEYDE, OF DRESDEN, GERMANY.

SPEED-MEASURER FOR ROTARY SHAFTS.

SPECIFICATION forming part of Letters Patent No. 715,067, dated December 2, 1902.

Application filed August 15, 1901. Serial No. 72,188. (No model.)

*To all whom it may concern:*

Be it known that I, JULIUS HEYDE, a subject of the King of Saxony, residing at Dresden, in the Kingdom of Saxony and German Empire, have invented certain new and useful Improvements in Speed-Measurers for Rotary Shafts, of which the following is a specification.

My invention relates to speed-indicators of that class in which the speed of the shaft being tested is indicated, said indication being dependent upon the position of a movable element counteracted in its movement by time-train-actuated mechanism tending to automatically move said element at an equal speed in an opposite direction.

In this invention I use as the moving element a screw or worm moved axially by a similar element on a shaft connected to that shaft or other part whose speed is to be measured. The mechanism to impart an equal speed in an opposite direction to said moving element is a disk rotated at a uniform speed and driving a friction-roller whose speed is transmitted by a suitable train of gearing to said moving element, the relative radial position of the roller to the disk causing a corresponding variation in the speed of the transmission-gearing to correspondingly move the worm in an opposite direction, and the relative axial position being a measure of the speed.

Figure 1:
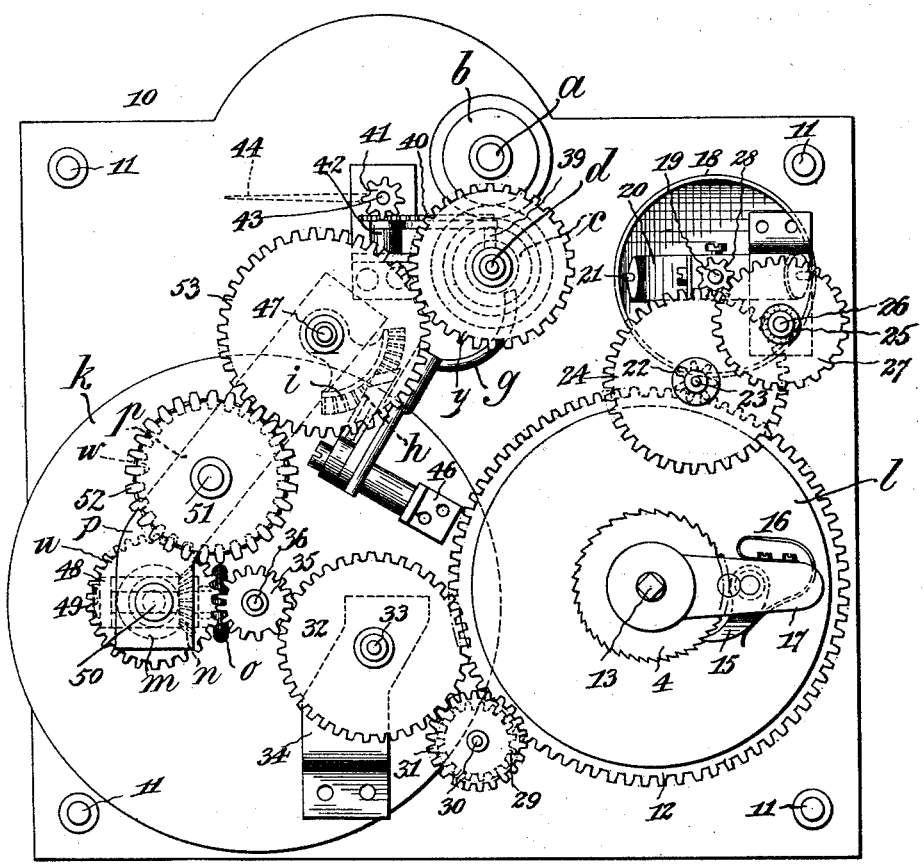
Figure 2:
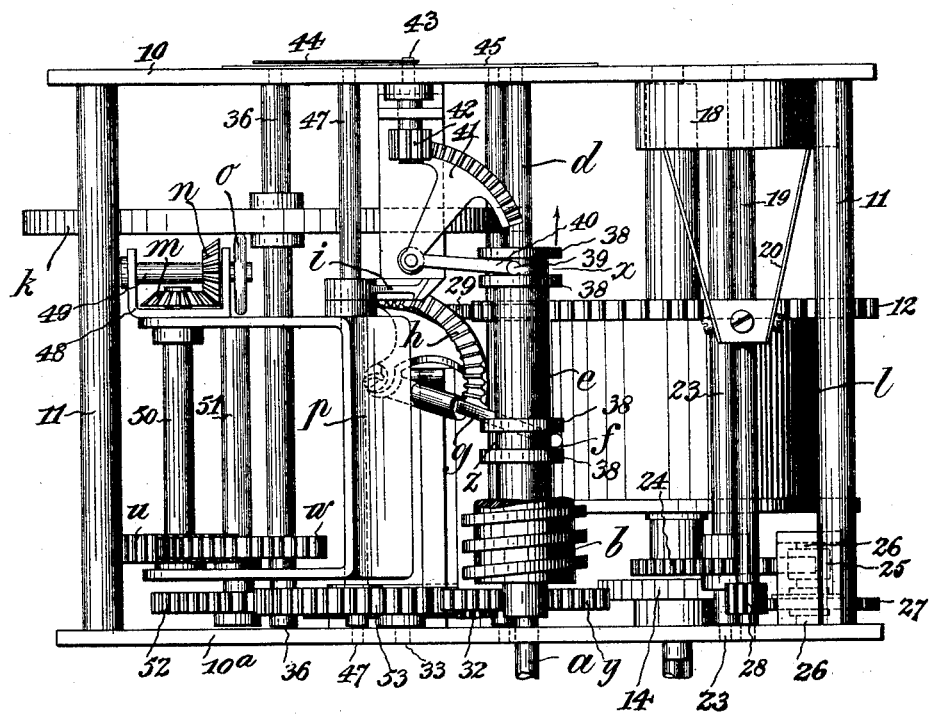
Figure 3:
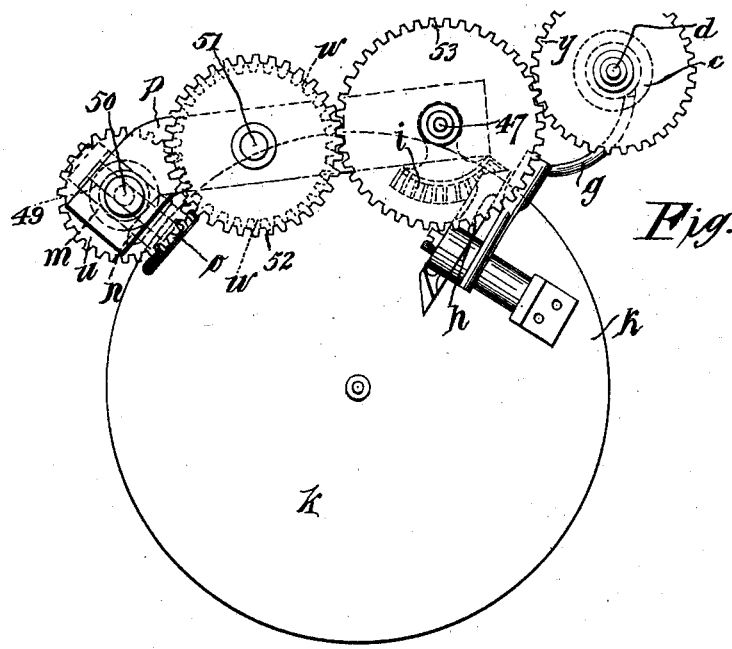
Figure 4:
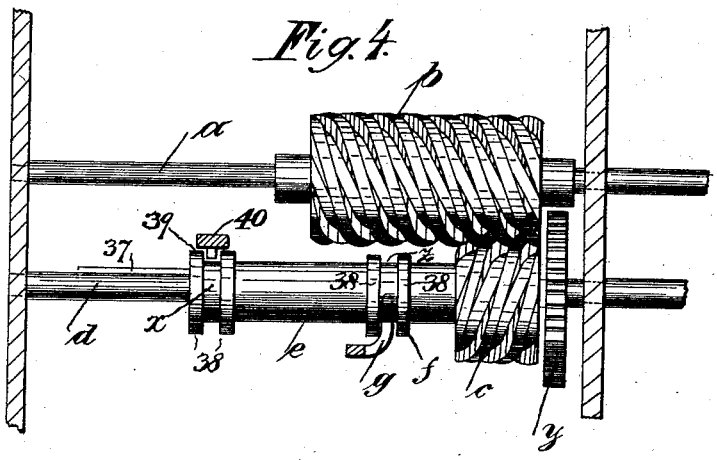

Referring to the drawings, in which like parts are similarly designated, Figure 1 is an end view of the device with one of the end frame-plates removed. Fig. 2 is a top plan view. Fig. 3 is a view showing the disk rotating at constant speed, the friction-roller substantially radially movable across the disk, and the train to move the screw in an opposite direction proportional to the speed of the friction-roller. Fig. 4 shows the worm $c$, that is positively driven from the part whose speed is to be indicated and negatively driven by the friction-roller. Fig. 5 is a view looking in the direction of the arrow, Fig. 2, of the time or clock train only that imparts motion to the disk $k$. In this view the governor has been rotated ninety degrees and the rim 18 shown in section to expose the ends of the arms 20. Fig. 6 is a perspective view of the mechanism to transfer movement from the disk to worm $c$.

The frame of the machine that supports the entire mechanism comprises two end plates 10 and 10$^a$, held by and distanced from one another by suitable posts 11.

I will first describe the time transmission or train to impart uniform angular velocity to the rotating disk $k$. This mechanism comprises an ordinary spring-barrel $l$, provided with a toothed wheel 12, and to the inner periphery of this barrel is connected one end of a coil-spring, (not shown,) the other end of which is connected to the winding-arbor 13, on which the drum is free to revolve. To prevent the arbor from being rotated by the spring instead of the drum, the customary ratchet-wheel 14 is secured to the arbor. A pawl 15, urged by a spring 16, trails on said ratchet 14 and is mounted on a stationary part or bracket 17, thus preventing the shaft from turning except in the winding direction. The spring-barrel drives both a governor and the disk. This governor comprises a circular stationary friction-rim 18, through which centrally passes a governor-arbor 19, carrying two spring-arms 20, each provided with a weighted head 21, capable of being frictionally retarded by contact with the rim 18. The governor-arbor 19 is speeded by a step-up gearing comprising a pinion 22 on an arbor 23 and driven by the wheel 12 on the drum. The arbor 23 carries a wheel 24, that drives a pinion 25 on an arbor 26, said arbor also carrying a wheel 27, that gears with a pinion 28 on the governor-arbor 19. The barrel $l$ also drives the rotating disk $k$ by step-up gearing comprising a pinion 29 on an arbor 30, that carries a wheel 31, gearing with a larger wheel 32, mounted on an arbor 33 in a stationary element or bracket 34. The wheel 32 drives a pinion 35 on the arbor 36, on which the disk $k$ is rigidly mounted.

The indicating mechanism comprises a main shaft $a$, to which the element whose speed is to be indicated is connected, said shaft carrying a worm-wheel $b$, rigidly secured thereto. This worm-wheel engages a second worm-wheel $c$ of the same diameter, but much shorter, so that by the turning of the former the latter will be moved laterally. The second worm c is secured on a sleeve e, slidable but not rotatable on a shaft d. The sleeve has an internal longitudinal groove that takes on a feather or key 37, Figs. 4 and 6, on the shaft d, and the sleeve is also provided with collars 38, that form two grooves x and z. The worm c, with its sleeve e, is therefore shifted axially by means of the worm b. Into the groove x takes a pin 39 on the end of an arm 40, that is rigidly connected to a toothed sector 41, that engages and rotates a pinion 42 on one end of an arbor 43, that carries at its opposite end an index-hand 44, movable around a circular scale 45 on the plate 10, that indicates the speed. Into the other groove z takes the free end f of an arm g, rigidly connected to a sector h, mounted on a bracket 46. This sector gears with one, i, fixed on a rotatable shaft 47, that also has fixed to it a frame p. The frame p has fixed to it a yoke 48, in which is journaled an arbor 49 on which is secured a miter-pinion n and a friction-wheel o, the latter in frictional contact with the uniformly-rotating disk k. The miter-pinion n gears with one, m, on the end of a shaft 50, journaled in the frame p. The shaft 50 carries within the frame a wheel u, gearing with wheel w, fixed on a shaft 51, that is also journaled in the frame p. Fixed on this shaft 51 and outside the frame p is a wheel 52, that rotates one, 53, loose on the shaft 47, that carries the frame p. This loose wheel 53 gears with one, y, fast on the shaft d, and rotates this shaft with the screw c, that is connected to it by the feather 37. The tendency is to drive the screw b, but in so doing the screw c and sleeve e will be moved to the right, Fig. 4, so that the lateral shift of the screw c to the left by the screw b is equalized by the lateral shift to the right by rotating the screw c. The two speeds of rotation—to wit, that of shaft a in one direction—and that of shaft d in an opposite direction are equalized, and the screw c is neither shifted to the right nor to the left. Now when the speed of the rotating element to be measured is decreased then for the moment the screw c is rotating faster than that b. The consequence is that the screw c is shifted to the right, Fig. 4. This movement carries with it the two arms 40 and g, that engage the sleeve e, secured to the screw c. The sector 41 by pinion 42 rotates the pointer 44 nearer the zero-point of the scale 45. At the same time the arm g rotates the sector i on shaft 47 to drop the outer end of the frame p and bring the friction-roller o nearer to the center of the uniformly-rotating disk k to such a point that this roller will impart a rotation to the shaft d equal to that at which the shaft a is driven.

The greater the distance of the friction-roller o from the center of the uniformly-rotating disk k the greater will be its speed, and vice versa.

The two worms b and c are preferably but not necessarily of the same diameter; but whatever their size they must have the same pitch in order to intermesh.

A suitable casing (not shown) of course incloses the entire device.

The operation will be as follows: The part whose speed is to be measured is connected to shaft a, that carries worm b, the connection being either direct or indirect, as the exigencies of the case require or permit. The spring is supposed to have been wound by the arbor 13 and the disk k set in motion by the time transmission above described. The worm b being driven will move the worm c laterally to the left, Figs. 2 and 4, the sleeve moving with it. In so doing the sides of the grooves act on the parts 39 and f to move them also to the left, thereby rotating the sector-wheels 41 and h, the former directly rotating the index-hand 44, and the latter rotating the sector i and shaft 47 to swing the frame p outward, so that the friction-wheel o will be nearer the periphery of the disk k. This disk k indirectly rotates the screw c in a direction to tend to shift the screw b by the following mechanism. The friction-wheel o being rotated by the disk k drives the miter-wheels n m, shaft 50, and wheel u. This wheel drives the wheel w, shaft 51, and the wheel 52. The wheel 52 drives the one, 53, that is loose on the shaft 47, to which the frame p is connected, and in turn drives the wheel y on the shaft d, that carries the worm c. The worm c not being able to shift the worm b, is then itself shifted toward the right to such a point where the speed of rotation of the worm c will be equal to that of the worm b, and this speed is automatically attained by the movement of the frame p to position the friction-wheel o in its proper radial position on the disk k.

Having thus described my invention, what I claim as new therein, and desire to secure by Letters Patent, is—

1. In a speed-indicator, the combination with a worm mounted so as to be capable of two distinct movements, one a movement of rotation about the axis of the worm and the other a bodily movement along such axis; of mechanism to impart one of these movements to the worm from the element whose speed is to be measured, means to impart the other of said movements, and mechanism to regulate said means and controlled from said worm, substantially as described.

2. In a speed-indicator, the combination with a worm mounted to be capable of two distinct movements, one a movement of rotation about the axis of the worm and the other a bodily movement along such axis; of mechanism actuated by the element whose speed is to be measured to impart bodily movement along the axis in one direction to the worm and means to rotate the worm, controlled by its said axial movement to move it in the other direction along its axis, substantially as described.

3. In a speed-indicator, the combination with a worm mounted to be capable of two distinct movements, one a movement of rotation about the axis of the worm and the other a bodily movement along such axis; of mechanism actuated by the element whose speed is to be measured to impart bodily movement along the axis in one direction to the worm, and frictionally-driven mechanism to rotate the worm and controlled by the axial movement of the worm, substantially as described.

4. In a speed-indicator, an element rotated by the part whose speed is to be measured, a rotating element movable on its axis in one direction by the first-mentioned element, a disk having uniform angular velocity, a friction-wheel contacting with said disk and means actuated by the friction-wheel to rotate the second element and thereby move it axially in the other direction, substantially as described.

5. In a speed-indicator, a worm adapted to be rotated from the element whose speed is to be measured, a second rotatable worm meshing therewith and axially movable, a disk rotating with uniform angular velocity, a friction-wheel contacting with said disk and mechanism driven by the friction-wheel to transmit to the second worm a rotation equal to the speed with which the first worm is rotated, substantially as described.

6. In a speed-indicator, a worm adapted to be rotated from the element whose speed is to be measured, a second worm meshing therewith and axially movable, a swinging frame and an index-hand both moved by said second worm, a rotating disk, a gear-train also carried by the frame and moved by the disk to rotate the second worm in a direction opposite to the rotation of the first, substantially as and for the purpose set forth.

7. In a speed-indicator, a worm adapted to be rotated by the element whose speed is to be measured, a second worm axially movable by the first, and mechanism to rotate the second worm at the same speed, substantially as described.

8. In a speed-indicator, a worm adapted to be rotated by the element whose speed is to be measured, a second worm axially movable in one direction by the first worm, means to rotate the second worm, means to control said axial movement by varying the rotation of the second worm, and an index mechanism for moving the same by the axial movement of the second worm, substantially as described.

9. In a speed-indicator, a rotatable worm adapted to be rotated by the element whose speed is to be measured, a second worm axially movable in one direction by the first worm, a uniformly-rotating disk, means positioned by the axial movement of said second worm and actuated by the disk to rotate the second worm and thus tend to axially move the same in the other direction, substantially as described.

10. In a speed-indicator, a worm adapted to be rotated by the element whose speed is to be measured, a shaft, a second rotatable worm axially movable thereon and meshing with the first worm, an element rotated independently at uniform angular velocity, a frame swung relatively to said last-named element by the second worm and mechanism carried by the frame and actuated by said element to rotate the shaft and second worm, sustantially as described.

11. In a speed-indicator, a worm adapted to be driven by the element whose speed is to be measured, a shaft, a second worm thereon secured by a feather and axially movable on the shaft, a disk, a clockwork to rotate the disk, a frame, a friction-wheel carried thereby in contact with the disk, a gear-train actuated by the wheel to rotate said shaft, an index, means to position the index and means to shift said frame and thus alter the radial position of the wheel relatively to the disk, both moved by the second worm, substantially as and for the purpose set forth.

12. In a speed-indicator, a worm adapted to be driven by the element whose speed is to be measured, a shaft, a sleeve axially slidable thereon and provided with grooves $x$ and $z$, a second worm secured to the sleeve, a disk, a clockwork to drive the disk, a governor to control the speed of the clockwork, a frame, a frictional wheel mounted thereon and held in contact with said disk, a gear-train moved by said wheel to rotate the shaft and worm, a scale, an index, means to take into the groove $x$ to position the index relatively to the scale, and means taking into the groove $z$ to swing said frame, substantially as described.

13. In a speed-indicator, a worm adapted to be rotated from the element whose speed is to be measured, a second rotatable worm meshing therewith and axially movable, a disk rotating with uniform angular velocity, and independent clock mechanism to drive the disk, a friction-wheel contacting with said disk and mechanism driven by the friction-wheel to transmit to the second worm a rotation equal to the speed with which the first worm is retated, substantially as described.

14. In a speed-indicator, a worm adapted to be rotated by the element whose speed is to be measured, a second worm axially movable by the first, mechanism to rotate the second worm at the same speed in an opposite direction and an index rotated by said second worm, substantially as and for the purpose set forth.

In testimony whereof I have hereunto set my hand in the presence of two witnesses.

JULIUS HEYDE.

Witnesses:
HERNANDO DE SOTO,
PAUL ARRAS.